United States Patent [19]

Brandner et al.

[11] Patent Number: 4,768,485
[45] Date of Patent: Sep. 6, 1988

[54] MIXTURE CONTROL FOR AN INTERNAL COMBUSTION ENGINE

[75] Inventors: Burkhard Brandner, Werdohl; Albert Stübs, Lüdenscheid; Martin Pawlik, Plettenberg; Klaus Wenzlik, Iserlohn, all of Fed. Rep. of Germany

[73] Assignee: Atlas Fahrzeugtechnik GmbH, Werdohl, Fed. Rep. of Germany

[21] Appl. No.: 48,944

[22] Filed: May 12, 1987

Related U.S. Application Data

[63] Continuation-in-part of Ser. No. 817,724, Jan. 10, 1986, abandoned.

[30] Foreign Application Priority Data

Jan. 10, 1985 [DE] Fed. Rep. of Germany ....... 3500608
Sep. 18, 1985 [DE] Fed. Rep. of Germany ....... 3533197

[51] Int. Cl.⁴ ................................................ F02B 3/00
[52] U.S. Cl. .................................... 123/440; 123/489
[58] Field of Search .................... 123/489, 440, 491

[56] References Cited

U.S. PATENT DOCUMENTS 4,140,085 2/1979 Rabas ................................. 123/440
4,156,404 5/1979 Anzai ................................. 123/440
4,324,218 4/1982 Hattori .............................. 123/440
4,580,539 4/1986 Kitahara ............................ 123/440

Primary Examiner—Ronald B. Cox
Attorney, Agent, or Firm—Peter K. Kontler

[57] ABSTRACT

A mixture control for an internal combustion engine with a lambda probe and with a memory device containing nominal values for the fuel supply dependent on operational values of the engine, as load, rotational speed and temperature. The mixture control renders it possible to optimize the consumption and/or emission, under consideration of the operating conditions, in the entire moving range of an internal combustion engine. The memory device comprises address positions selectable by the operating values of the internal combustion engine and also by the actual lambda value, and stores nominal values for the fuel supply in the form of a map for a characteristic field. The probe voltage and the internal resistance of the lambda probe are determined. A temperature-corrected signal denoting the actual value of lambda is generated by determining a correction value from two measuring signlas such as probe voltage and the internal resistance of the probe, and the signal denoting the corrected actual value is fed to the memory device as address signal.

6 Claims, 4 Drawing Sheets

MIXTURE CONTROL FOR AN INTERNAL COMBUSTION ENGINE

This application is a continuation-in-part of U.S. patent application Ser. No. 817,724 filed Jan. 10, 1986, now abandoned.

BACKGROUND OF THE INVENTION

1. Field of the Invention

The invention relates to a mixture control for an internal combustion engine with a lambda probe and with a memory device containing nominal values for the fuel supply dependent on operational values of the engine, such as load, rotational speed and temperature.

2. Description of the Prior Art

For the mixture control, it is known to rely the so-called lean burn concept which involves the use of an air surplus and leads to an optimizing of the fuel consumption. As is known the $NO_x$ values are reduced in this operating mode. It is possible that the HC values are slightly increased. For such operation in the lean burn range, it is necessary to provide a lambda probe in the exhaust gas duct. The lambda probe is adapted to measure directly the oxygen content in the exhaust gas or to determine the lambda value in another manner.

DE-OS No. 33 21 424 describes a mixture control wherein, on the one hand, the nominal value of lambda=1, and, on the other hand, a nominal value of lambda for the lean burn mode may be given. These two nominal values are processed in separate control loops. A shifting between these two nominal values is effected parameter-dependent. On the basis of such an operation with two lambda nominal values a sufficient optimizing cannot be reached. Particularly in the lean burn range the presentation of only one nominal value of lambda for all the operating conditions is insufficient in order to guarantee the driveability.

In addition, thorough investigations and checks have disclosed that by setting a fuel injection value according to the nominal value of lambda an optimum moving behavior cannot be reached due to the fact that the differences between various specimens of the internal combustion engines are too pronounced. A compensation of the spread between such specimens is not possible on the basis of that concept.

A mixture control is also known from DE-OS 32 48 745. Therein basic values of lambda are corrected according to the ascertained fluctuations of rpm. These corrected values serve as desired values for a control. The corrections do not always provide unequivocal operating values so that the engine does not always operate in an optimum manner.

US-PS No. 45 66 419 describes a control for the air/fuel ratio of an internal combustion engine. A ROM stores nominal values for the injection time of the injection valve and also nominal values of lambda. A microprocessor calculates correction values in relation to operating parameters and to the actual value of lambda. Then a corrected injection time is calculated. This method requires a number of calculating steps so that it is difficult to calculate the corrected values within each revolution, especially for higher speeds.

OBJECTS AND SUMMARY OF THE INVENTION

It is an object of the invention to provide a mixture control which renders it possible to optimize the consumption and/or emission in the entire moving range of an internal combustion engine emission under consideration of the operating conditions.

According to the invention, this object is accomplished in that the memory device comprises address positions selectable by the operating values of the internal combustion engine, and also by the actual lambda value and contains the nominal values for the fuel supply in the form of a map for a characteristic field, that the probe voltage and the internal resistance of the lambda probe are determined, and that a temperature-corrected actual value of lambda is generated by determining a correction value from two measuring signals such as voltage and probe internal resistance of the probe, the corrected actual value being fed to the memory device as address signal.

The invention differs from the prior art in that the nominal values of lambda in the entire operating field of the internal combustion engine are temperature-corrected and fed as multi-bit values into the memory device. The corrected lambda values select together with other operational values of the engine an address position containing a multi-bit value for the fuel supply, such as the injection time or the adjusting value for a carburetor. Since the address positions can be selected directly, the correct fuel supply value is available for each revolution of the engine without any time lag. These values for the fuel supply consider on the one side, the driveability of the internal combustion engine as well as the requirements of power and performance. According to the load values one can provide a full load range with lambda values close to 1 and part load ranges with higher lambda values. In each case the lambda values may be determined in such a manner that fluctuations of rpm of the internal combustion engine are avoided. Due to the fact that the fuel supply is controlled under consideration of the lambda values, the mixture control is independent of the differences between various specimens of the individual internal combustion engines of a series. In addition, multiple bit nominal values for the exhaust gas recycling valve are provided.

A drastic reduction of the CO and $NO_x$ portions is reached by the fuel control of the present invention. Should the HC values in the air surplus region exceed the admissible limit values, then it is possible to employ an oxidation catalyst.

The probe voltage of a lambda probe comprises for the stoichiometric value lambda=1 a discrete variation, which is utilized many times. However, if it is desired that the internal combustion engine operate in the lean burn range, it is necessary to evaluate lambda values between 1 and 2. There the absolute voltage values and the voltage alterations as a function of lambda are very small so precise mesurements are required. As is known, the output voltage of a lambda probe has a temperature dependence. In case of lambda values above 1, these temperature-dependent voltage variations are so pronounced that an unequivocal lambda determination is not possible any more. Thus, a temperature compensation is necessary for a stable engine operation, with a low content of pollutants. Also the internal resistance of a lambda probe has a temperature-dependence.

The probe voltage is utilized for the determination of two signal values, namely on one hand, for the probe voltage itself and, on the other hand, for a voltage signal proportional to the internal resistance of the probe. Due to the fact that these two values are related via a temperature-dependent identification field, a temperature-compensation of the probe voltage or of the voltage for the internal resistance of the probe is possible so that one can obtain a temperature-corrected actual value of lambda. A temperature-measurement via an additional temperature sensor is not necessary.

The output voltage of the probe is evaluated in a multiplex operation in such a manner that a periodically effective shift stage applies the probe voltage once directly to a holding stage and in the shifted condition, on the one side, to a load resistor presenting a load voltage and, on the other side, to a holding stage for the load voltage. Thus, the probe voltage is, on the one hand, held directly. On the other hand, a load voltage is formed, which is a function of the internal resistance.

The probe voltage and the load voltage are evaluated in such a manner that a quotient of signals denoting the probe voltage and load voltage is formed in a division stage which generates a signal proportional to the internal resistance of the probe.

A complete correction can be achieved in that the voltage and the voltage corresponding to the probe internal resistance of the probe are combined under utilization of a correction identification field for the generation of a signal denoting a temperature-corrected actual value of lambda. In the identification field the correction values can be balanced and compensated thoroughly.

Depending on the magnitude of the correction values or other criteria, the voltage for the internal resistance of the probe may be corrected as a function of the probe voltage or the probe voltage may be corrected as a function of the internal resistance of the probe.

A correction with discrete individual values is possible in that the correction identification field is formed as a characteristic field map memory, the address positions of which are interrogated as a function of the probe voltage and the voltage for the internal resistance of the probe.

DESCRIPTION OF THE PREFERRED EMBODIMENT

Figure 1:
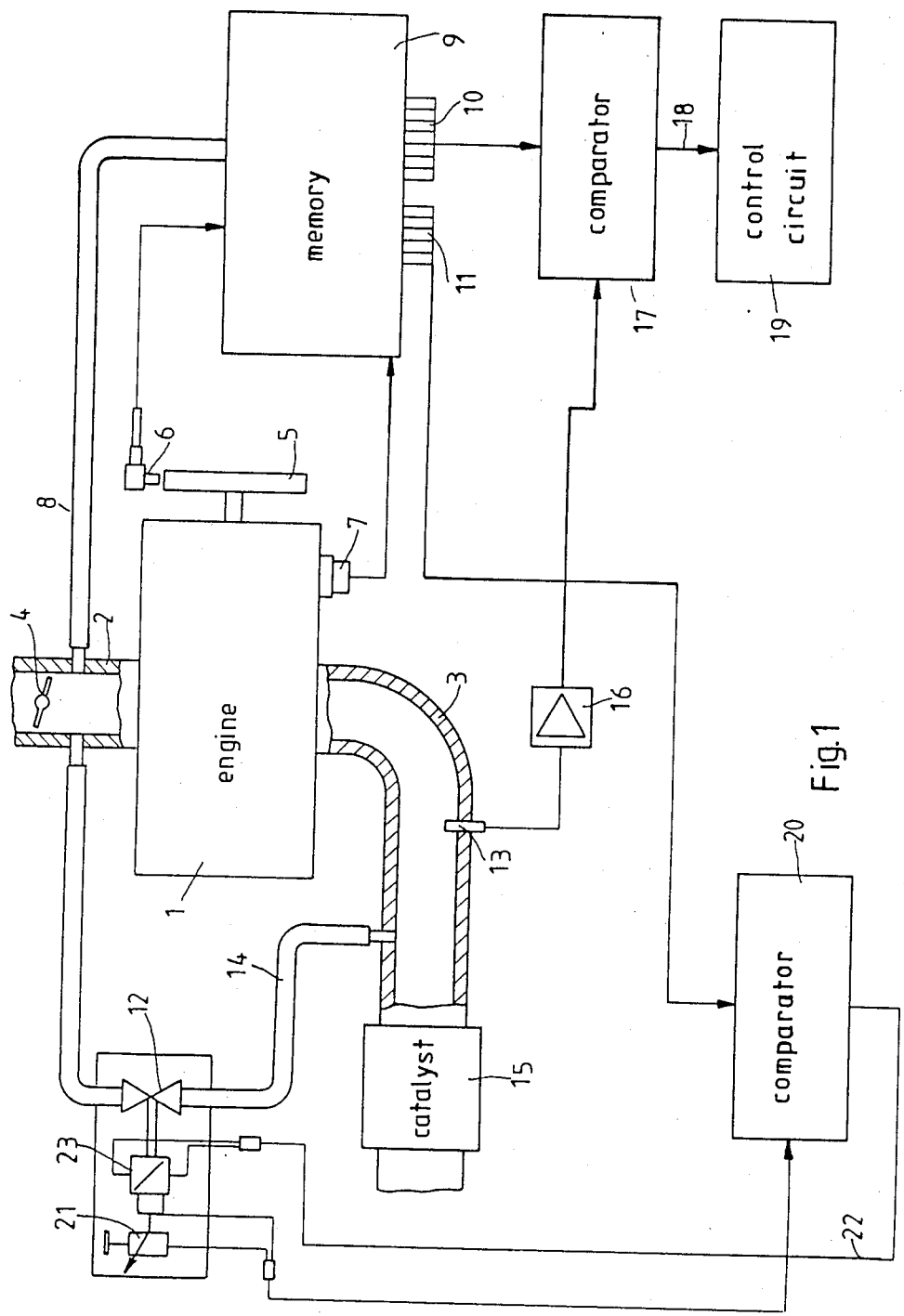
FIG. 1 is a block diagram of the entire mixture control.

FIG. 1 shows an internal combustion engine 1 having a suction duct 2 and an exhaust gas duct 3. The suction duct 2 is controlled by a throttle valve 4. The fuel supply is not shown in detail. It is possible to provide a controllable carburetor or a fuel injection system. The crankshaft of the internal combustion engine drives a disk 5, e.g. a flywheel, having marks which are sensed by a sensor 6, normally a gear rim sensor. This gear rim sonsor 6 renders possible to determine the speed of the internal combustion engine. An additional sensor 7 serves to measure the temperature of the internal combustion engine via the cooling water or via the suction air. A load sensor 8 determines the load of the engine by the suction-pipe pressure.

Signals from the sensors 6, 7 and 8 are applied as address inputs to an address memory or characteristic field memory 9. Within this address memory the address positions are organized according to characteristic speed lines of a map which are arranged according to operational parameters, such as the load upon and/or the temperature of the internal combustion engine 1. The memory positions of the address memory 9 contain in the individual bit positions an 8-bit lambda nominal value 10 and/or a 6-bit nominal value 11 for an exhaust gas recycling (EGR) valve 12. The bit-number of the specific nominal values depends upon the organization and the capacity of the address memory 9.

A lambda probe 13 measures the oxygen content of the exhaust gases in the exhaust gas duct 3. The lambda probe measures continuously the lambda values between 0.9 and 1.9; as is known, 1.0 corresponds to the stoichiometric oxygen portion. The exhaust gas duct 3 is connected with a recycling line 14 which is controlled by the already mentioned exhaust gas recycling valve 12 and through which exhaust gas is recycled into the suction duct 2. Optionally, the exhaust gas duct 3 may end in an oxidation catalyst 15.

The signals from the lambda probe 13 are amplified in an amplifier 16. The output signal of the amplifier 16 is applied, together with the 8-bit lambda value 10 to a comparator circuit 17. The output 18 of the comparator circuit 17 supplies according to the result of the comparison a setting value signal to a control circuit 19 for the carburetor adjustment or the fuel apportioning in the case of an injection system.

The signal denoting the nominal value 11 of the exhaust gas recycling ratio is applied to a comparator circuit 20. The exhaust gas recycling valve 12 is coupled with a position indicator 21 which supplies a signal denoting the position of the exhaust gas recycling valve 12 to the comparator circuit 20. The comparator circuit 20 delivers through a line 22 a setting signal to the setting drive 23 for the exhaust gas recycling valve 12. Instead of a position indicator 21, it is also possible to install a flow meter in the recycling line 14 the signal of which is evaluated accordingly.

The address memory 9 comprises an operating characteristic field for the entire operating range of the internal combustion engine. For each operating value an 8-bit lambda nominal value is stored so that a proper operation, i.e. without rpm fluctuations of the internal combustion engine, is guaranteed in the air surplus region. Thereby emission of CO and $NO_x$ pollutants is reduced. The fuel apportioning for the internal combustion engine 1 is effected via a control loop, because a simple presentation of injection values, in order to reach a lambda value, would not be sufficient due to differences between various specimens of internal combustion engines. By means of this control loop via comparator circuit 17 and the control circuit 19, a steady operation of the internal combustion engine in the lean burn range is possible with a reduction of the emission of pollutants and with simultaneous optimizing of the fuel consumption. An increase, not avoidable, of the HC values in this operating range may be reduced by the oxidation catalyst 15, the operation of which is considerably more economical than that of a three-way catalyst, necessary otherwise.

Figure 2:
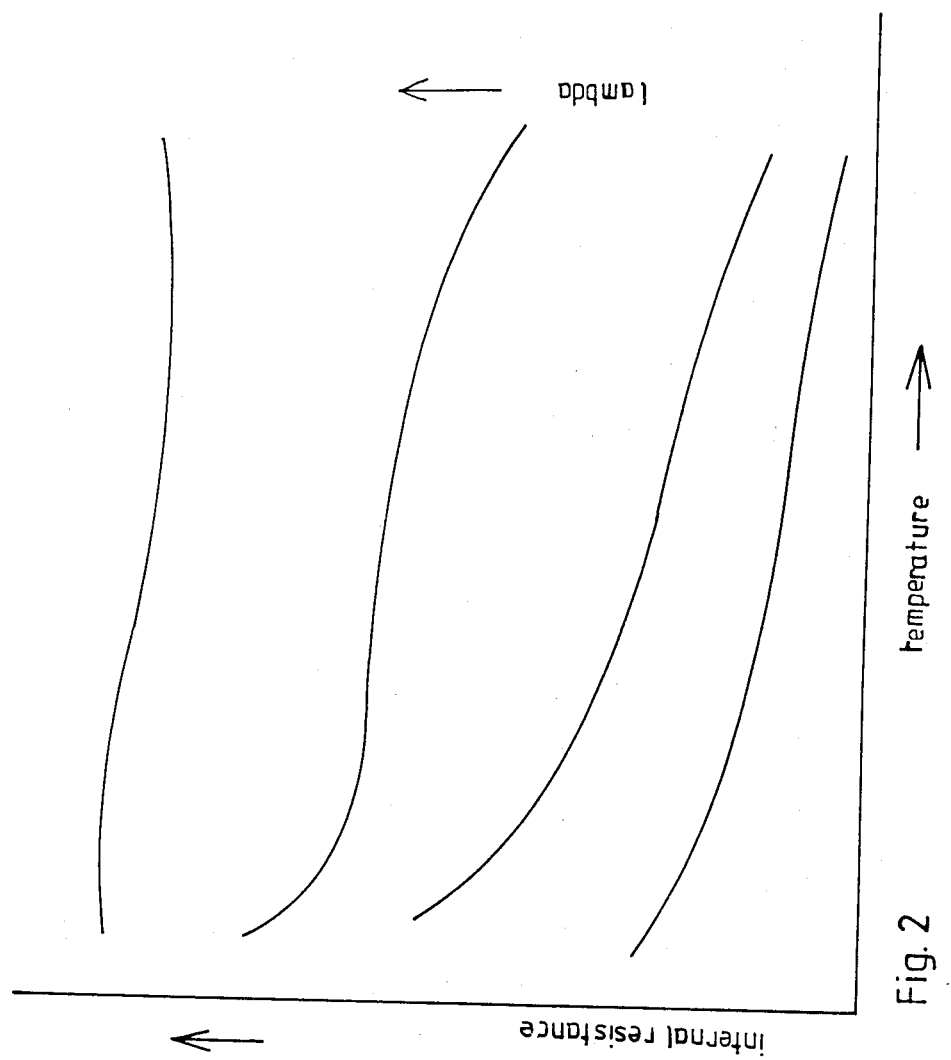
FIG. 2 is a characteristic field of the probe internal resistance as a function of the temperature with lambda as parameter.

FIG. 2 shows the course of the internal resistance of the probe 13 as a function of the temperature. The four curves apply for four lambda values as parameters. These four lambda values are in each case greater than 1 and increase with superimposed curves. It is clearly evident that the internal resistance decreases with increasing temperature. In the case of higher lambda values obviously further influences are involved which may reverse the direction of variation. It is evident from the curves that the variation of the internal resistance as a function of the working range of the temperature is quite large. However, on the basis of such a temperature identification field it is possible to correct the specific probe voltage as a function of the internal resistance so that a temperature-corrected lambda signal can be deduced from the probe voltage.

Figure 3:
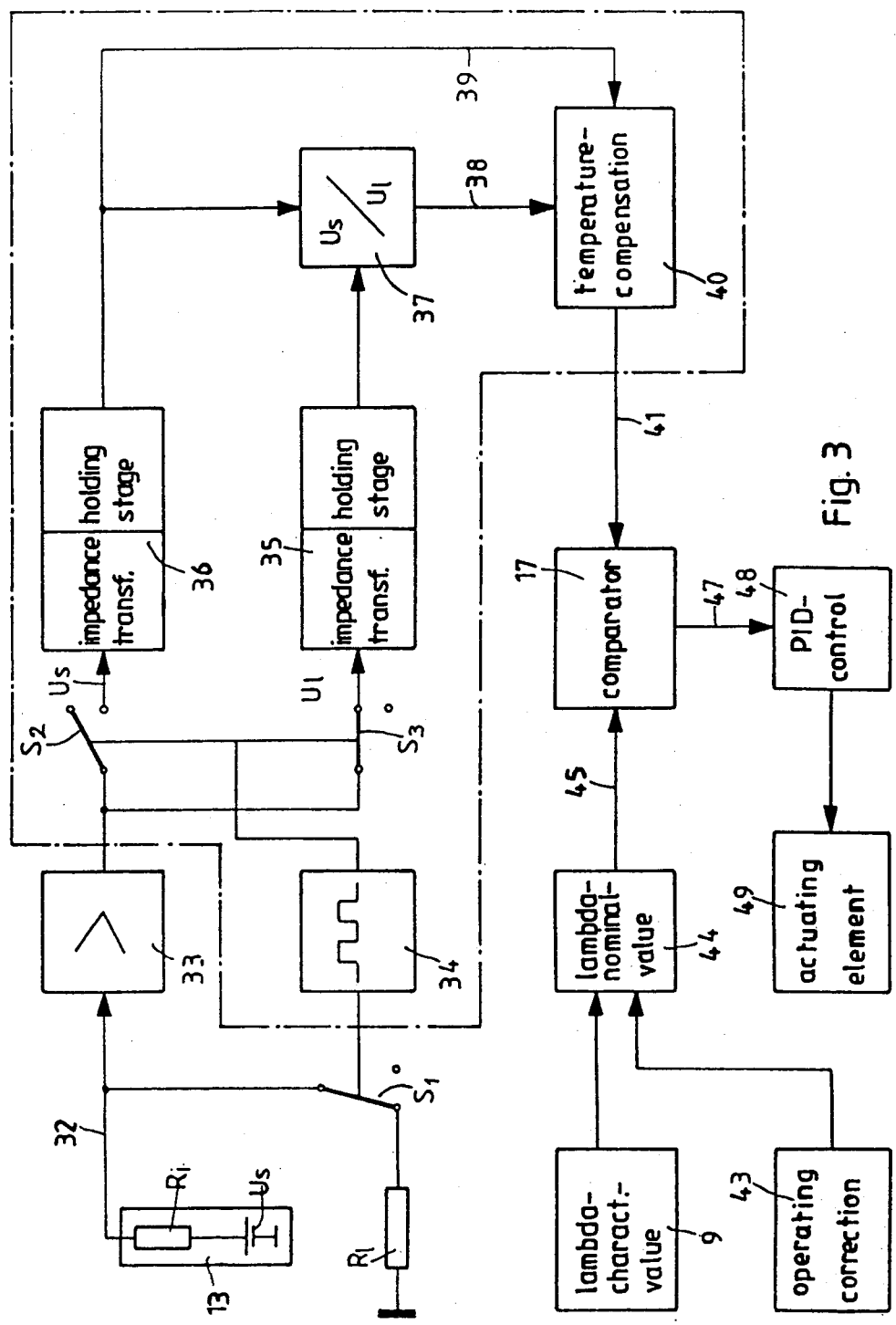
FIG. 3 is a block diagram of the mixture control according to the invention, whilst

A circuit suitable for this is shown in FIG. 3. FIG. 3 shows a lambda probe 13 which is shown as an equivalent circuit and contains a source of a probe voltage Us as well as an internal resistance Ri. The probe voltage Us is sensed on a line 32 and is amplified by an amplifier 33. A shift stage 34 is provided as oscillator for the generation of rectangular signals which serve for the switching of switches S1, S2 and S3. In one of its positions, the switch S1 establishes, a connection between the line 32 and a load resistor R1. The line 32 is unloaded in the other position of the switch S1. The switches S2 and S3 are operated in the push-pull mode and allow a multiplex operation. If switch S1 connects the line 32 to the load resistor R1, the switch S3 is closed so that via switch S3 the probe voltage U1, loaded by load resistor R1, is applied to a holding stage 35. An impedance transformer is arranged before the holding stage 35.

In the other position of the switch S1, when the probe voltage is unloaded, the switch S2 is closed so that the unloaded probe voltage Us is applied to the holding stage 36; an impedance transformer is provided ahead of the holding stage 36. The output voltages of the holding stages 35 and 36 are divided in a division stage 37 so that one obtains on the line 38 an uncorrected signal denoting the internal resistance.

For the internal resistance Ri of the probe as is known the following formula applies:

$$Ri = \frac{Us - U1}{U1/R1}$$

From this one obtains by conversion:

$$\frac{Us}{U1} = \frac{Ri + R1}{R1}$$

Since R1 is constant, one obtains by division in the division stage 37 a value, which is substantially proportional to the internal resistance Ri of the probe.

Line 38 and line 39, which latter transmits the probe voltage as a measure for the actual value of lambda, are connected to a compensation circuit 40. In this circuit a temperature compensation is effected via an identification charcteristic field according to FIG. 2 so that on the line 41 a signal denoting the temperature-corrected actual value of lambda is available. The correction circuit 51 for presenting the temperature-corrected lambda value is framed by a dosh-dotted line.

The compensation circuit 40 may be an identification field memory, the address positions of which are selectable by the values for the uncorrected internal resistance of the probe and the probe voltage. The correction may be carried out in such a manner that the value for the internal resistance of the probe is corrected via the probe voltage, or vice versa. That depends on practical points of view.

The address memory 9 generates a lambda presentation in the case of operating conditions of the internal combustion engine for which a lean burn mode is to be realized. Stage 43 comprises assembly groups which monitor the operating condition of the internal combustion engine and place at disposal corresponding correction signals if a lean burn mode cannot be guaranteed, particularly when running idle, in case of acceleration and in case of full load. From the output signals of stages 9 and 43 a nominal value lambda is formed in the stage 44. This nominal value is applied via a line 45, together with the actual value of lambda through line 41, to the comparator 17 which supplies via line 47 a correction signal for a PID-controller 48. The PID-controller 48 delivers a setting signal for a positioning element 49 which controls the mixture distribution in the internal combustion engine. An influence is possible, e.g. by the actuation of the throttle valve, by an exhaust gas recycling, by a setting of the fuel supply, or in another manner.

Figure 4:
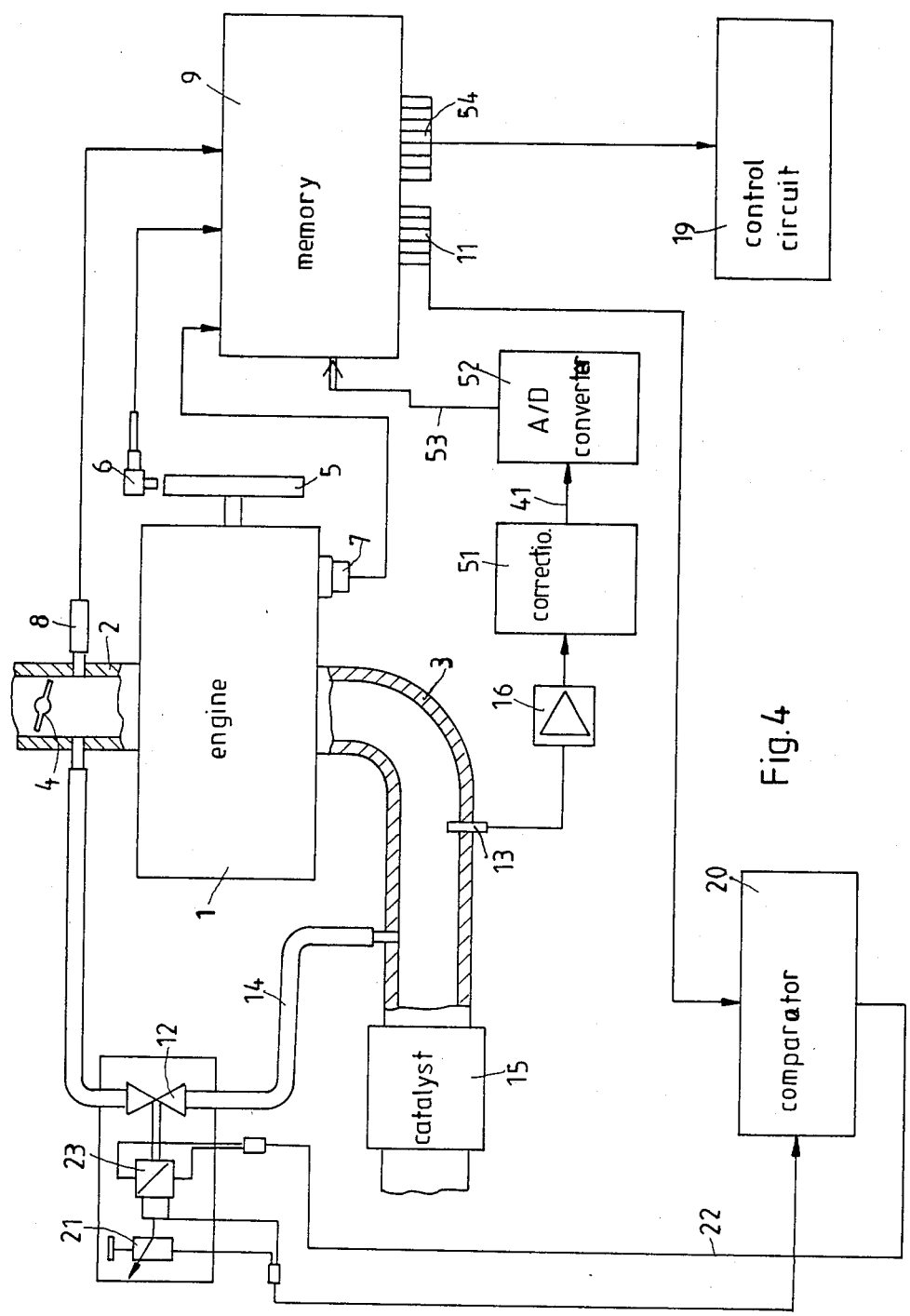
FIG. 4 shows a block diagramm of a modified mixture control.

FIG. 4 shows a modified embodiment of the invention, similar to FIG. 1. Signal denoting the uncorrected actual lambda value at the output of the amplifier 16 is transmitted to the correction circuit 51 built as explained in detail with reference to FIG. 3. Line 41 transmits a signal denoting a temperature-corrected actual value of lambda in analog form. Such signal is digitalized in an A/D converter 52 into a multi-bit signal 53 for the actual lambda value. This multi-bit signal 53 is a further address selection signal for the memory 9. Dependent upon the actual value of lambda a charcteristic field is selected so that a multi-bit signal 54 for the injection time is present. The multi-bit signal 54 is transmitted to the control circuit 19 for the injection valve. The multi-bit signal 54 can also be a signal for the carburetor. The embodiment of FIG. 4 allows to control the injection time in dependency upon load, temperature, speed and actual lambda value.

We claim the following:

1. A mixture control for an internal combustion engine, comprising a probe arranged to transmit signals denoting the value of lambda; a memory device containing (a) nominal values for the fuel supply dependent upon operational values of the engine including the load, rotational speed and temperature, (b) address positions selectable by said operational values of the internal combustion engine and by the value of lambda, and (c) nominal values for the fuel supply in the form of a map for a characteristic field; signal generating means for determining the voltage and the internal resistance of the probe; means for generating temperature-corrected actual lambda value signals including means for determining a correction value from signals denoting the voltage and the internal resistance of the probe and for transmitting said temperature-corrected actual lambda value signal to said memory device as an address signal; first and second holding stages; a load resistor; and a periodically effective shifting stage for the application of probe voltage once directly to one of said holding stages and, in the shifted condition of said shifting stage, to said load resistor on the one hand and to the other of said holding stages on the other hand.

2. Mixture control according to claim 1, further comprising an impedance transformer in front of each of said holding stages.

3. Mixture control according to claim 1, further comprising an additional stage for generating a quotient of the probe voltage and the load voltage and for transmitting a signal which is proportional to the internal resistance of the probe.

4. Mixture control according to claim 2, further comprising a temperature compensation circuit for correcting the signal from said additional stage with a correction identification field and for generating a signal denoting a temperature-corrected actual value of lambda.

5. Mixture control according to claim 4, wherein said correction identification field is a characteristic field map memory the address positions of which are interrogated as a function of the probe voltage and of the internal resistance of the probe.

6. Mixture control according to claim 1, further comprising an exhaust gas recycling valve, said memory device further comprising multiple bit nominal values for setting said valve.

* * * * *